United States Patent [19]

Coillet

[11] 4,234,419
[45] Nov. 18, 1980

[54] PROCESS FOR THE REMOVAL OF INORGANIC SALTS FROM A WATER STREAM

[76] Inventor: Dudley W. Coillet, 12 Ross Rd., Belmont, Mass. 02178

[21] Appl. No.: 82,725

[22] Filed: Oct. 9, 1979

[51] Int. Cl.³ .............................................. C02F 1/42
[52] U.S. Cl. .................................. 210/664; 210/677; 210/687; 210/688
[58] Field of Search .................. 210/26, 28, 29, 30 R, 210/34, 37 R, 38 R, 38 A

[56] References Cited

U.S. PATENT DOCUMENTS

| | | | |
|---|---|---|---|
| 2,793,183 | 5/1957 | Thurman | 210/34 |
| 2,807,582 | 9/1957 | Applebaum | 210/26 |
| 3,350,292 | 10/1967 | Weinberger et al. | 210/26 |
| 3,700,592 | 10/1972 | De Pree | 210/34 |
| 3,941,693 | 3/1976 | De Pree | 210/34 |

Primary Examiner—Ivars C. Cintins

Attorney, Agent, or Firm—Flehr, Hohbach, Test, Albritton & Herbert

[57] ABSTRACT

Inorganic salts are removed from an unpotable water stream, particularly a salt-containing inland water stream. The stream is passed sequentially through anion and cation exchange beds. Periodically the anion exchange bed is regenerated with sodium hydroxide and the cation exchange bed with hydrochloric acid to form spent regenerant streams which are combined with hydrochloric acid in the presence of calcium ion to precipitate calcium salts of anions from the mixture. The soluble portion is then mixed with sodium hydroxide in the presence of carbonate ion to precipitate insoluble cations from the mixture as hydroxides or carbonates. The soluble portions, comprising essentially an aqueous sodium chloride stream, is separated into a more concentrated and less concentrated portion. The more concentrated stream is electrolyzed to provide a source of hydrochloric acid and sodium hydroxide for the above steps, while the less concentrated stream is recovered as a source of potable water.

20 Claims, 1 Drawing Figure

PROCESS FOR THE REMOVAL OF INORGANIC SALTS FROM A WATER STREAM

BACKGROUND OF THE INVENTION

The invention relates to the removal of inorganic salts from an unpotable water stream containing such salts, and specifically to the formation of a potable water stream with minimal waste liquid stream discharge.

The conversion of inorganic salt-containing inland water streams to potable water generally includes the concentration of the dissolved solids into one fraction while reducing the remaining fraction to potable specifications, e.g., by reverse osmosis, electrodialysis, and/or ion exchange. These procedures require that the concentrated brine be discharged as a waste liquid stream. This is particularly unsatisfactory in the treatment of inland waters far removed from a sea coast, as there is no convenient mode of disposal of the concentrated liquid streams. It would be desirable to provide a process in which liquid wastes produced in such a conversion are reduced to very low levels, while conversely increasing the potable product water yield of untreated feed water.

OBJECTS AND SUMMARY OF THE INVENTION

It is a primary object of the invention to remove inorganic salts from an unpotable water stream containing the salts, preferably to produce potable water.

It is a particular object of the invention to provide a process of the above type in which liquid waste water streams are reduced to a minimum while providing an exceptionally high yield of potable product water.

It is another object of the invention to form commercial byproducts, such as liquid chlorine, hydrochloric acid and sodium hydroxide, which are useful during the process as well as for sale when produced in excess.

Further objects and features of the invention will be apparent from the following description taken in conjunction with the appended drawing.

In accordance with the above objectives, inorganic salts are removed from unpotable water streams containing the same, specifically from inland natural water sources. Such water streams are passed sequentially through anion and cation exchange resin beds. Periodically, the anion exchange bed is regenerated with sodium hydroxide and the cation exchange bed is regenerated with hydrochloric acid. The spent regenerant streams from the exchange beds are mixed with acidifying agent in the presence of soluble calcium ion to precipitate insoluble calcium salts of a variety of anions present in the mixture. Then the soluble regenerant stream portion is mixed with a causticizing agent, preferably sodium hydroxide, in the presence of carbonate ion to precipitate cations in the mixture, including calcium, magnesium, ferrous and/or manganous ions, in the insoluble hydroxide or carbonate form. The soluble portion of the stream is separated into more concentrated and less concentrated sodium chloride aqueous stream, as by distillation. The more concentrated stream is electrolyzed to form sodium hydroxide and hydrochloric acid. A portion of the sodium hydroxide is used for regeneration of the anion exchange bed, while a portion of the hydrochloric acid is used for regeneration of the cation exchange bed. Preferably, the hydrochloric acid is used for pH adjustment in the acidification step, while the sodium hydroxide is used for pH adjustment during causticizing step. The less concentrated stream is recovered, preferably as a potable water stream.

DETAILED DESCRIPTION OF THE PREFERRED EMBODIMENT

In general, the present process is applicable to the removal of inorganic salts from unpotable water streams containing the salts. It is particularly effective for the treatment of inland water, that is, water that is not readily transportable to an ocean, sea or other large salt water body for disposal since the process minimizes the volume of waste water. As defined herein, the term "feed water," will designate the water streams to be treated by the present process. Such feed waters include ground water, including geothermal brine, waste waters, including field drainage and urban waste water, and aqueous waste from the operation of evaporative cooling towers and certain processes of industry and energy conversion. The term feed water will include, in addition, water which has undergone prior processing, e.g., reverse osmosis or electrodialysis, before treatment herein.

In general, the feed water streams to which the present invention is applicable include a variety of anions to be removed, such as sulfate, phosphate, silicate and fluoride, in addition to the prevalent chloride ion. The cations to be removed typically include one or more of the following—calcium, magnesium, ferrous or manganous, in addition to the prevalent sodium ion.

In general, feed water of the foregoing type first is treated in the conventional filtration system for the sequential removal of anions and cations. The novelty of the system resides in the preparation of materials for regeneration of the filtration system and the use of the spent aqueous regenerant streams to produce regenerants as well as products of commerce and to provide a minimum volume of aqueous waste water.

Figure 1:
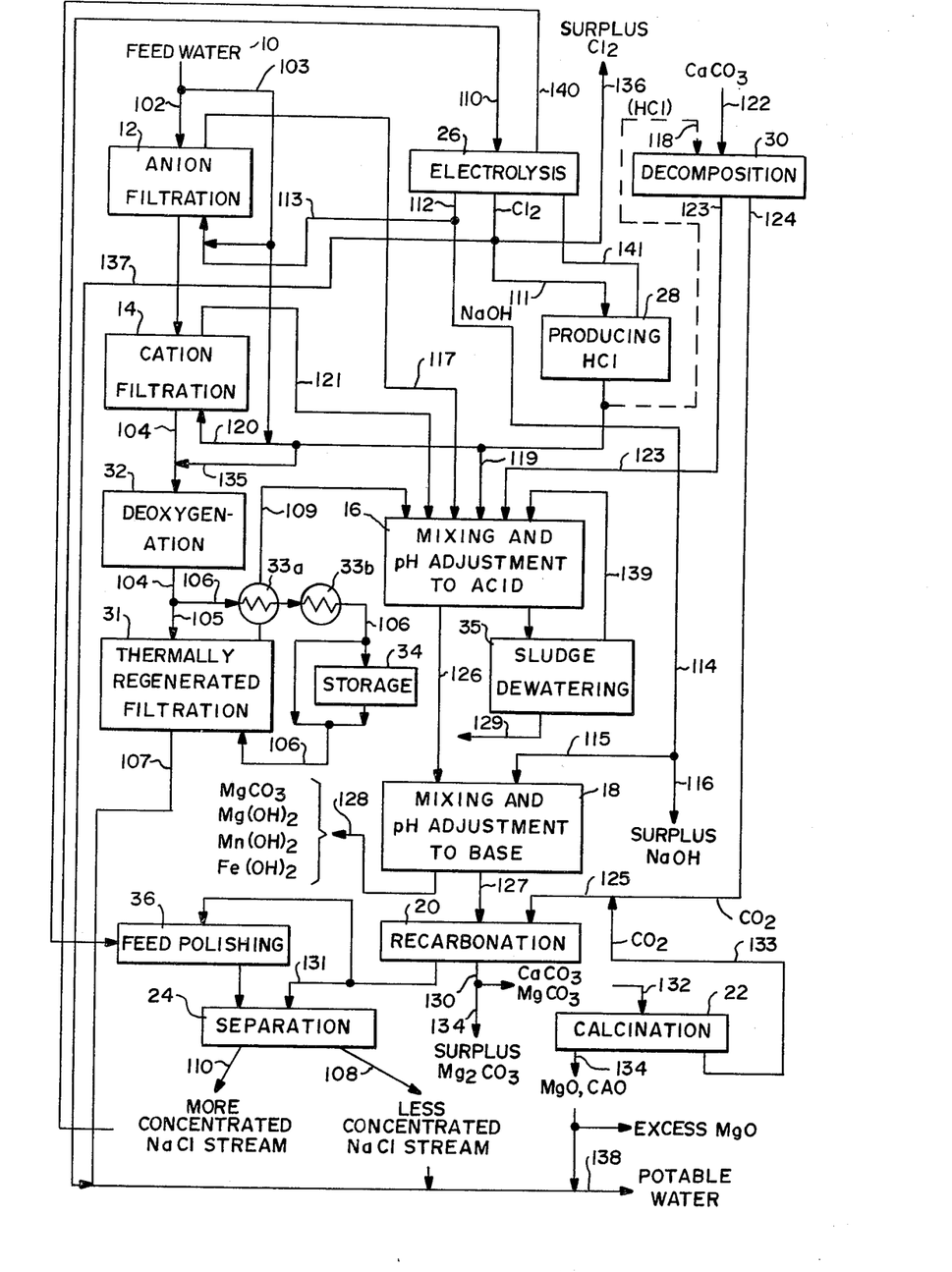
The drawing is a schematic flow diagram of the process in accordance with the present invention.

Referring specifically to the preferred method illustrated schematically in FIG. 1, feed water 10 is sequentially treated in an anionic filtration step 12, followed by a cationic filtration step 14. It should be understood that the invention also contemplates a reversal in the order of cationic and anionic filtration.

The filtrate from step 14 has been substantially reduced in anion and cation concentration and, depending on the nature of the original feed water, may be used as a pure water source for certain applications. However, it is preferable to mix the filtrate with products of treatment of the spent regenerant streams to form potable water as set out below.

Referring specifically to anion filtration step 12, the feed water is efficiently contacted with a basic anion exchange material in the form of porous polymer spheres, such as a resin sold by Rohm and Haas, under the designation Amberlite IRA 68, in the free base form. The ion exchange sites preferably contain exchangeable hydroxyl ions which exchange for the soluble anions in feed water to be removed, such as sulfate, carbonate, fluoride, silicate, and phosphate. The contactor in which the resin is retained is known as an ion-exchange filter and may be of a conventional type, typically being constructed of rubber-lined steel or stainless steel provided with stainless steel fittings.

Periodically, it is necessary to regenerate the ion exchange sites to remove the anions of the feed water which have been retained by the filter. Such regeneration requires a regenerant solution containing hydroxyl ions (such as 4 to 12 weight % aqueous sodium hydroxide solution), for the resin after it has removed the above anions from the feed water. Regeneration may be performed continuously on a portion of the resin removed from the bed for filtration step (12) while filtration continues with the remainder of the resin followed by recycle of the regenerated resin. Alternatively, regeneration may be performed in situ during periodic shutdown of the resin bed.

Referring to step 14, a cation filter bed of porous polymer spheres may be utilized of the same general type as used in anion filtration, except that the bed includes weakly acidic exchangeable hydrogen and sodium cations. Resins sold by Rohm and Haas, under the designation IRC 84 or IR 120, which have been regenerated with hydrochloric acid or strong sodium chloride brine solution, are suitable. The process results in substitution of multivalent cations from the feed water, such as calcium, magnesium, manganese, or iron, which occupy the sites of the polymer previously occupied by the exchangeable hydrogen or sodium cations. The displaced hydrogen or sodium ion enters the aqueous filtrate stream. Periodically, a regenerant aqueous solution rich in hydrogen ions, preferably hydrochloric acid, is passed through the resin bed for regeneration. The spent regenerant stream is a stream rich in the foregoing cations.

If desired, sodium cation from a source such as a concentrated sodium chloride solution, may be used in place of hydrogen cation for regeneration.

Conventional processing conditions, such as the frequency of regeneration, concentration of the regenerant streams and ratio of regenerant to feed water, may be used in anion filtration step 12 and cation filtration step 14. Such processing parameters may vary to a significant extent depending upon the type of feed water to be processed.

A third stage of feedwater processing may be employed to extract sodium chloride from the feedwater without the use of chemical regenerants. The sodium chloride is useful as a source of material to be electrolyzed to form sodium hydroxide and hydrochloric acid regenerants as described below. Such sodium chloride extraction can be accomplished in many ways, for example by freezing out the said sodium chloride as a eutectic solid containing approximately twenty three percent sodium chloride with water, which is described in "Design and Specification Bid Package, 10,000 GPD Eutectic Freeze Pilot Plant," Office of Water Reserach and Technology/S76, No. 18, U.S. Department of Interior, Order Number PB250455.

Referring to FIG. 1, this third stage of processing can also be accomplished by passing the filtrate from step 14 through a third ion exchange bed in filtration step 31 using thermally regenerated resins, such as the product of Diamond Shamrock having the designation "Sirotherm TR-10" or the product of Rohm and Haas having the designation "XD-4." For the ion-exchange variety of third stage processing, the filtrate from step 14 preferably is given a preliminary treatment to avoid chemical changes in the resin which are injurious to its salt-absorbing capabilities. Acid or alkali or both, which may arise from any source but preferably arise as a byproduct of electrolysis as hereinbelow described, is added so that the result of percolation of the pretreated feedwater through the resin is not to cause unwanted leakage of hydrogen cations or hydroxyl anions from the resin to the filtrate from step 31. Furthermore oxygen, which is dissolved in the filtrate from step 14, is reduced in concentration to a level less than 0.1 ppm (0.05 ppm maximum is preferred). This may be accomplished by dispersing the feedwater in a vessel in which the pressure is approximately 1 psia or by bubbling an inert gas through the feedwater at any pressure, or in other ways. In the flow diagram, the oxygen removal is designated as step 32.

Downstream of step 32 the feedwater is divided into two streams. The major part of the feedwater flows in stream 105 which, at approximately ambient temperature, percolates through the resin bed of filtration step 31 and by so doing dissolved solids pass to or are "loaded upon" the resin, making less saline the filtrate from step 31 (stream 107) when compared to the feedstream 105. Stream 106, the minor part of the feedwater, passes through two heat addition processes 33a and 33b the result produced by which is elevation of temperature of stream 106 from approximately ambient temperature to approximately 95° C. Step 33a is a heat exchanger process with used regenerant 109.

Step 33b is any suitable means of temperature elevation of the regenerant, preferably steam heating or direct injection of steam, including direct electric resistance heating. A storage step 34 may optionally be added downstream of the heat exchange step 33b as indicated in FIG. 1 in which hot water is stored in an insulated tank; this option is preferred if fixed-bed ion-exchanger equipment is employed in step 31 to achieve a more constant rate-of-flow of stream 106, and lower process heat consumption. Recovery into stream 106 of heat contained in stream 109 is an important economic step. Therefore, heat-exchanger step 33b is used and includes exchange with other fluids, such as a hot liquid, vapor, or gas stream which may be from any source.

The residual exchange capacity of the resin in filtration step 31 becomes diminished as it becomes "loaded" with salts, and the exchange capacity requires periodic renewal by "unloading" in a regeneration process. During regeneration the filtrate stream 105 does not pass through the resin being regenerated, instead regenerant which is hot water is drawn either from storage step 34 or the heat-exchange steps 33a and 33b or both. The direction of flow of the said regenerant being preferably opposite to what had been the direction of the filtrate; this maximizes the effective transfer of salt per unit of regenerant used with the ion-exchange variety of step 31.

Whichever variety of the step 31 is used, a more concentrated brine which contains minor amounts of dissolved solids other than sodium chloride are transferred as stream 109 to step 16, and a less saline aqueous stream 107 becomes one component of the aqueous blend which is the product water of the process.

A major function of step 31 is to augment the source of sodium chloride from the feed water to be electrolyzed in step 26, described below, to form make-up sodium hydroxide and hydrochloric acid regenerants for steps 12 and 14, respectively. Alternative modes of augmenting such regenerants also may be employed in partial or complete substitute of step 31, depending in large part on the maximum salinity permissible for product stream 138. For example, a portion of a feedwater 10 may be subjected to reverse osmosis to form a concentrated sodium chloride brine stream for use in conjunction with the sodium hydroxide and/or hydrochloric acid regenerant streams, respectively. Alternatively, if readily available, external brine and/or hydrochloric acid and/or sodium hydroxide auxiliary regenerant streams may be used in conjunction with the regenerants formed during electrolysis.

In mixing and pH adjustment step 16, the regenerant streams from anion filtration step 12 and cation filtration step 14 are mixed in a mixing vessel with a soluble calcium ion source in order to precipitate the calcium salt of one or more anions which had been removed in the spent regenerant stream from anionic filtration step 12. Anions, such as sulfate, phosphate, silicate, and fluoride which are present in the original feed water are precipitated with calcium. A desirable pH level in which to remove this wide range of salts is about 4.5 to 6.0 and preferably on the order of 5.5, the particular level to be selected depending upon the type and concentration of the anions to be removed. This normally requires the addition of an acidifying agent. In that regard, a typical pH level for the spent regenerant from anionic filtration is on the order of 9, while that from the spent regenerant from cation filtration is on the order of 3 to 4.

A preferred source of acid to adjust the pH level of the solution is a by-product from electrolysis of a concentrated sodium chloride stream to produce hydrochloric acid which is used for this purpose. In certain instances, the electrolysis produces hydrogen and chlorine gas which are then converted to hydrochloric acid. Alternatively, by conventional membrane technology, hydrochloric acid may be produced directly from electrolysis. This will be set out more fully below.

It may be that the initial feed water includes sufficient calcium content for precipitation of the foregoing anions. However, typically it does not and so a soluble calcium source is added in step 16 to provide an excess of calcium to accomplish precipitation. One soluble calcium source is calcium chloride produced from a source to be described more fully below.

The insoluble calcium salt precipitate from step 16 is separated from the soluble regenerant stream portion which is directed to a second mixing and pH adjustment step 18, also performed in a suitable mixing vessel. The preferable causticizing agent for step 18 is sodium hydroxide more by an electrolysis step to be described for fully below. While the outside pH ranges of about 8.5 to 11.3 may be used, preferable pH ranges are from 9.5 to 10.5.

In step 18, alkaline earth metal ions, such as magnesium and calcium may be removed together with transition metal cations, such as manganous and ferrous ions. To accomplish this removal, a pH level on the order of 10.5 or higher is employed.

It is preferable to use step 18 in conjunction with a recarbonation step 20, carried out in the presence of a carbonate source. In this manner, calcium carbonate and magnesium carbonate are removed from the system. A lower pH on the order of 9.5 favors the formation of carbonate salts rather than hydroxides. The presence of the carbonate ion is essential to remove any excess calcium from the system and is preferable for the removal of magnesium, as removal of magnesium carbonate is more complete than the magnesium removed in the hydroxide form. This is because magnesium carbonate is substantially less soluble in water than magnesium hydroxide. Thus, it is preferable for a stoichiometric excess of carbonate ion over magnesium ion to be present.

In the drawing, steps 18 and 20 are illustrated in sequence to highlight the fact that both chemical reactions occur. In practice, it may be desirable to carry out steps 18 and 20 simultaneously in a single mixing vessel. Thus, in a typical feed water stream, calcium, magnesium, ferrous and/or manganous are the most important cations to be removed and they are precipitated in either the insoluble hydroxide or carbonate form.

In certain instances, there is sufficient carbonate ion present in the feed water to perform recarbonation in step 20. However, more typically, an external carbonate source, carbon dioxide, is added in this step, preferably from one or more sources as described below.

In step 18, the hydroxides are removed as a highly concentrated by-product with a minimal water content and so is readily disposed as a waste material. Whether or not steps 18 and 20 are performed in combination, the precipitate from the carbonate-containing product, calcium carbonate and magnesium carbonate, may be disposed of as a solid waste material, or alternatively may be calcined by heat from a conventional source to form magnesium oxide and calcium oxide which are sold as a commercial product. Carbon dioxide generated during calcination may be mixed in step 20 as a source of carbonate ion for the recarbonation step.

After separation of the precipitates in steps 18 and 20, the separated soluble stream consists essentially of an aqueous sodium chloride brine stream. In separation step 24 the stream is divided into a more concentrated sodium chloride stream and a less concentrated sodium chloride stream. The less concentrated stream 108 may be utilized as a low inorganic salt-containing aqueous solution for combination with the filtrate from cationic filtration step 14 to form a potable water stream.

The more concentrated sodium chloride stream 110 is utilized as a source of brine for electrolytic conversion to sodium hydroxide and chlorine or hydrochloric acid. The use of the more concentrated stream increases the efficiency of electrolysis.

Separation step 24 is preferably performed by multiple effect evaporative distillation. The concentration of the more concentrated stream is preferably from at least 10 to 20 percent sodium chloride up to saturation (about 38 weight % sodium chloride). Conversely, the less concentrated sodium chloride stream is preferably at a level for convenient combination with the filtrate from step 14 to form potable water. Typical level of this less concentrated stream is on the order of 500 ppm or less.

The equipment used for evaporation and condensation in step 24 may be of a conventional type. The processing conditions and size and configuration of the equipment are governed by the feed stream compositions, ion exchange efficiency, desired throughput and the like.

The more concentrated sodium chloride stream is directed to electrolysis step 26. Two different conventional modes of electrolysis are particularly suitable to the present invention. Both of these include an anode formed of carbon or of platinized titanium with a cathode formed of iron or of mercury. Both utilize aqueous sodium chloride at a minimum concentration of about 10 weight percent but are most efficient when the sodium chloride concentration is close to saturation (around 38 weight %).

In one form of electrolysis, known as the membrane process, a membrane separates the anodic from the cathodic chamber which retains sodium chloride and the product sodium hydroxide in aqueous solution, at a typical concentration of about 5 to 25 weight % sodium hydroxide in the cathodic chamber. There an iron cathode is employed resulting in evolution from the cathode of hydrogen gas. Chlorine gas is simultaneously emitted from the anode with both gases being discharged separately from the cell. Suitable equipment for this form of electrolysis is of the Stewart (Hooker) type supplied by Diamond Alkali Corporation or of the Dow type supplied by Dow Chemical Corporation.

In another form of electrolysis, known as the mercury cathode process, the membrane is excluded. The cathode consists of mercury which flows rapidly in a shallow pool along a trough of iron which also contains an aqueous concentrated sodium chloride solution flowing rapidly. Both fluids are recirculated. Electrolysis of the sodium chloride occurs when an anode is inserted into the sodium chloride solution at a voltage of about 4.5 volts with respect to the cathode. Upon electrolysis, sodium cation is electrically discharged at the cathode and sodium amalgam is the resulting product at the cathode. Simultaneously, chloride anions are discharged at the anode forming chlorine gas. In the course of amalgam recirculation, appropriate amounts of sodium are removed from the amalgam by chemical reaction between water and the amalgam which results in the evolution of hydrogen and production of a concentrated (50% by weight) aqueous sodium hydroxide byproduct. Suitable equipment for this form of electrolysis is of the Kastner-Kellner type supplied by Olin Matheson Chemical Corp. U.S.A. or The Solvay Company, Belgium or Oronzio De Nora of Milano, Italy.

The chlorine gas formed from electrolysis has multiple uses. For example, it may be used in that form for chlorination of a potable water stream product, as illustrated in the drawing. Also, if there is any surplus, it is a valuable article of commerce. In addition, an important function of the chlorine gas is that it is readily reacted with hydrogen gas from electrolysis to produce hydrochloric acid in step 28.

One use for the hydrochloric acid is as a regenerant for cationic filtration step 14. As the acid is produced at high concentration, it can be mixed with feed water for dilution to a range of about 4 to 10% for use as the regenerant solution for cationic filtration step 14.

Another use for the hydrochloric acid is as the source of acidifying agent in step 16. There, it can be provided in a concentrated form without prior dilution.

A third use for the hydrochloric acid is to provide a convenient source of soluble calcium ion. One readily available insoluble source of calcium is calcium carbonate. It may be conveniently solubilized by reaction with hydrochloric acid in decomposition step 30 to form calcium chloride which is added as the soluble calcium source in step 16 of the process. Carbon dioxide gas is a byproduct of this solubilization step, usable if required in the recarbonation step 20, and otherwise is a byproduct of the process.

The sodium hydroxide produced during electrolysis has analogous uses within the process to that of the hydrochloric acid. For example, it, too, may be diluted with feed water and utilized as a regenerant for anionic filtration step 12. A suitable concentration of sodium hydroxide for this purpose ranges from 3 to 15 weight %.

Another use for the sodium hydroxide is to adjust the pH level in steps 18 and 20 to precipitate the cations as described above. In addition, any surplus sodium hydroxide is a valuable article of commerce.

A further disclosure of the nature of the present invention is provided by the following specific examples of the practice of the invention. It should be understood that the data disclosed serve only as examples and are not intended to limit the scope of the invention.

EXAMPLE 1

Application of the process is exemplified with reference to the water source known as Las Vegas Wash (LVW) in the State of Nevada which annually discharges to Lake Mead approximately 50 million tons of water containing 200,000 tons of dissolved solids. The process hereinabove described would, if installed at the LVW Site of the Colorado River Water Quality Improvement program of the U.S. Department of Interior, convert annually 135,000 tons of the dissolved solids to insoluble material (chiefly magnesite and gypsum) disposable as environmentally innocuous filler, a further 32,000 tons approximately to a commercial grade of caustic soda plus 29,000 tons of commercial grade of chlorine, while converting the water to potable quality of 380 parts per million (ppm) dissolved solids, approximately.

All of the heretofore existing process which convert such inland waters to potable water produce salt-containing aqueous effluents; prevailing custom has permitted these to be reduced in volume by evaporation, a practice which leaves behind, as an envoronmental pollutant having a water-soluble form, the dissolved solids therein. By contrast, the process herein described produces in this instance no aqueous effluent as waste product; those dissolved salts not beneficiated to commercial chemical products, used within the process, or are contained in the potable-water product of this process, are converted to substantially insoluble and environmentally innocuous powder.

An understanding of the process applied in this example is assisted by reference to the process flow diagram, and to the table disclosing in detail the flow rate of dissolved solids referenced in each case to flows marked on the diagram. The flow in this working example commences with the saline source (10), one portion of which is a small stream (103) used to dilute the chemicals hydrochloric acid (at 120), which is the regenerating agent for the cation filtration step, and caustic soda (113), which is the regenerating agent for the anion filtration step. Feedwater not used in diluting regenerants passes first through the anion filtration step, wherein it flows through anionic exchange media mentioned hereinabove which has been regenerated so that it has exchange sites in the hydroxyl form. Anions of the bicarbonate and sulphate form are largely retained on the resin, and when a substantial fraction (10 percent of feed, approximately) of such anions leave with the filtrate, the resin exchange capacity is judged exhausted and the feed flow is shut off from this appratus and the exchange material within it is thereafter regenerated as outlined hereinbelow. Anion bed temperature is near ambient. The filtrate from the anion filtration step passes through a like cation filtration step 14, the said cation bed having been regenerated with hydrochloric acid (120). The filtrate flow is continued until a substantial fraction (10 percent of feed, approximately) of calcium and magnesium cations leave the cation bed with the filtrate, indicating the resin exchange capacity to be exhausted. The filtrate flow through the cation bed is then shut off and the exchange material within it is exhausted.

Cation filtration can precede anion filtration without change of concept; likewise an ion-exchange filtration apparatus of any design may be employed, including varieties known as the moving-bed or pulsed-bed types which are "continuous" in that filtration does not stop while regeneration takes place in the same vessel, but instead the absorbtion capacity of the resin bed used for filtration is maintained in a steady state by adding intermittently freshly-regenerated exchange material which has been prepared and stored in other vessels while withdrawing exhausted exchange material having approximately the same volume as the added freshly-regenerated exchange material.

Prior to regeneration, anionic and cationic exchange material ("resins") are subjected to strong reverse flushing with feedwater, a procedure known as "back-washing" which elutes entrapped fine solids.

To accomplish the process of regeneration of the anionic resin, the water stream 103 and the stream 113 of caustic soda are caused simultaneously to flow as a blend at such rates that the blend concentration is seven percent (range 1 percent to 15 percent) by weight approximately; the said blend or solution percolates through the resin in the bed which causes exchange in which hydroxyl anionic species pass to the resin from the water, and causes the aqueous outflow stream 117 to be composed of the sodium salts of eluted anionic varieties, principally carbonate, sulphate and silicate. In any such regeneration the cumulative used quantity of sodium hydroxide is approximately 118 percent (range 105 to 165 percent) of the equivalent of the total of eluted carbonate, sulphate and silicate. Regeneration temperature is approximately ambient. The caustic soda source (stream 113) is shut off when chloride is eluted from the resin and passes out with used regenerant stream 117 in quantity of approximately one percent by weight, thus indicating further regeneration would cause the resin to extract from 102 amounts of dissolved salt which would be more economically removed downstream in step 31. The resin is washed free of sodium hydroxide by passage therethrough of one bed-volume approximately of feedwater. The used regenerant and washwater pass via stream 117 to step 16. After regeneration the anionic resin bed is preferably washed by passage therethrough of one bed volume approximately of feedwater (stream 102) which passes via 103 with used regenerant to the step 16.

The Table 1 is a statement of daily flows in metric tons (2243 pounds, approximately) of dissolved salt components, and of water where these components are dissolved, for the flows of this example of streams numbered as in FIG. 1. It indicates a requirement, as regenerant in step 12, for caustic soda equivalent to 108.51 tons sodium cation and 11.03 tons of potassium cation, and this amounts to 203 tons daily of caustic soda dissolved solids.

The filtrate from step 12 passes to step 14 and, in its passage through the cationic exchange resin (Amberlite IRC 84, or IR 120 of Rohm and Haas) of step 14, multivalent cations of the calcium and magnesium varieties contained in the water pass to the resin in exchange for hydrogen cation. Exhaustion of the exchange capacity of the resin in step 14 is indicated by rapid rise in the outflow (stream 104) of calcium and/or magnesium cations (say rising to 10% of the composition of the feed) at which point feedwater flow through the cation bed is stopped, and regeneration commenced.

Backwashing and regeneration of the cationic resin in step 14 proceeds in exactly comparable manner to the above-described regeneration of anionic resin in step 12, except that hydrochloric acid is used from stream 120, diluted with water from stream 103 so that the hydrochloric acid concentration in the blend in approximately eight percent (range 4 to 15 percent) by weight. The regenerant flow at approximately ambient temperature percolates through the bed of resin until a substantial fall in outflow rate of calcium and magnesium occurs, indicating the resin to be in the sodim and hydrogen cation forms and its exchange capacity for calcium and magnesium to be restored. The said hydrochloric acid used amounts approximately to 108 percent (range 102 to 110 percent) of equivalence of eluted cationic species; the Table 1 flow of chloride in stream 120 includes 173.85 tons daily arising from hydrochloric acid used, the balance is contained in water used in regeneration. After regeneration the cationic resin bed may be washed with one bed volume of feedwater (stream 102) which passes via 121 with used regenerant to the step 16 described hereinbelow.

The filtrate from step 14 is adjusted in acidity so that the resin used in the subsequent filtration step 31 neither loses or gains in acidity from the passage of said filtrate through the resin. In this case hydrochloric acid is added via 135 from the step 28; the amount is over 15 tons daily expressed as chloride equivalent.

In other cases, which require that the pH at 104 is required to rise to match that of the resin, caustic soda which is derived from 113 is added to stream 104.

Upstream of step 31, the stream 104 passes through an oxygen-removal step 32, in which the dissolved oxygen content in 104 is reduced to 0.1 parts per million (ppm) maximum. In this example, stream 104 is degassed by passage at a pressure of 0.5 pounds per square inch (psi) absolute over loose packing in a vessel constructed to withstand vacuum. It is then divided into two streams. The smaller stream (106) comprises about 30 percent of the total and this is heated by some means, such as indirect heat exchange with hot fluids or flue gas, to a temperature of 95° C. (range 60° C. to 105° C.); this comprises the steps 33a and 33b. Optionally step 33 may be followed by step 34 which is its storage in an insulated tank constructed of suitable corrosion-resistant materials. This step 34 is necessary if regeneration is discontinuous whereas it is desired to maintain constant fluid flow through the heat-exchange steps 33a and 33b.

In step 31 the larger portion of stream 104 percolates through a bed of thermally-regenerated ion exchange resin with in this example is the product "Sirotherm TR-10" of Diamond Shamrock; for this resin the feedwater and regenerant are required to be approximately neutral (pH 7); an alternative is the resin XD-4 of Rohm and Haas, which requires an acid condition of pH 5.5 to exist in feedwater and regenerant. The effect of this percolation which takes place at ambient temperature approximately (range 2° C. to 42° C.), is the transfer to the resin of portion of the dissolved solids in stream 105; the concentration level of dissolved solids in the filtrate from step 31 (stream 107) is 505 ppm in this example. Typically this concentration level lies in the range 300 to 900 ppm, the extent of extraction of dissolved solids into the resin of step 31 is an operating parameter linked to the quantity of caustic soda and chlorine to be manufactured in the electrolysis step 26, and to the salinity level of the product water 138. The residual exchange capacity of the resin becomes diminished as it becomes "loaded" with salts, and the exchange capacity requires periodic renewal by "unloading" in a regeneration process of step 31. Regeneration is timed to commence when the salinity of the filtrate has a value of about 700 ppm (range 500 to 1100 ppm) and during regeneration stream 105 does not pass through the resin being regenerated.

The procedures for backwashing and regeneration of the resin in step 31 are alike to the regeneration associated with steps 14 and 12 except that hot water, having a temperature of 95° C. (range 60° C. to 105° C.) is the regenerant and it is drawn either from storage (step 34) or the heater (step 33) or both, and that the direction of regenerant flow through the resin is preferably countercurrent to what had been the flow direction of the filtrate. In this way the heretofore unused regenerant achieves the more complete "unloading" of that resin portion which in the subsequent "loading" or absorption phase receives salt from the least saline portion of the feedwater as it flows through the apparatus. The regenerant flow stops when the salinity of the efflux 109, which is the used regenerant, is reduced to approximately 400 ppm (range 200 to 1500 ppm) of the unused regenerant, or any other approximate indication that the available exchange capacity of the resin is no longer substantially occupied by dissolved salts originating from the stream 105. Used regenerant passes via 109 to step 16, passing to stream 106 approximately 75 percent (range 95 percent to 50 percent) of exchangeable heat in a heat exchange step 33a.

Step 16 takes place in a clarifier of any conventional design; in the central (mixing) zone of said clarifier streams 109, 121, and 117 are blended with an aqueous acidic solution of calcium chloride which may originate in any suitable way. Sufficient calcium chloride is added in step 16 so that the total calcium cation content of the aqueous materials added therein is more than equivalent to the sum of sulphate, silicate, fluoride, and phosphate anion content of the said aqueous materials. Sufficient hydrochloric acid is required to be added in the said mixing zone of step 16 so that the blended solutions in the said mixing zone have a pH of 4 maximum; in the example of Table 1 it has a pH of approximately 3. The consequence of the operation of step 16 is that the mixture of brines, which are regenerants of cationic, anionic, and thermally-regenerated resin exchange filtration of feedwater, are caused to precipitate the sulphate, silicate, fluoride, and phosphates of calcium, and those ionic, organic and bacterial residuals which adhere to such precipatated solids if they are present in the feedwater and are discharged to step 16 via absorbtion and recovery from the resins in the steps 12, 14 and 31 of this process.

It should be noted that by virtue of the acidic condition in the said mixing zone, bicarbonate is preponderant over carbonate, and remains in solution. The clarifier wherein step 16 is conducted is constructed of acid-resistant materials such as mild steel whch has been rubber-coated, and may be provided at the periphery or draw-off point with pressurized multi-media filters or suchlike devices which restrain suspended fine materials from flowing out via stream 126. A dewatering device 35 such as a centrifuge may optionally be attached at the slurry outflow which returns to step 16 via 139 excess water from the slurry of the said calcium salts before the latter are discharged as waste innocuous filler (stream 129). The temperature of the clarifier in the step 16 is substantially that of the blended feedstreams, which is above ambient. The said pressurized multi-media filters are back-washed from time to time as required to maintain sufficient flow therethrough, by recirculating filtrate from step 16 which is the stream 126 having the composition outlined in Table 1.

As has been mentioned hereinabove, the steps 18 and 20 are accomplished musts conveniently in a single process step; in such an event the filtrate in stream 126 is mixed in a clarifier in which a separate chamber permits treatment with carbon dioxide of the partly clarified aqueous liquid drawn off after rendering the solution of stream 126 alkaline by the addition of caustic soda from line 115. Such "recarbonation" takes place in alkaline solution of preferred pH of 9.5 which minimizes the removal of magnesium from solution in the step. The quantity of sodium hydroxide (stream 115) and of carbon dioxide (stream 125) has the value which achieves a sufficiency of removal of the magnesium cation so that the filtrate has a composition of dissolved solids which can be successfully electrolized in step 26; such amounts are shown in Table 1.

The two-step precipitation sequence of step 18 and step 20 are shown separate in FIG. 1 to more clearly illustrate the principle; the addition of all of the required caustic soda is shown added via stream 115 in step 18 which causes to precipitate the mixed hydroxides and carbonates of multivalent ions (about 80 tons daily of wet solids, which may optionally be dewatered, similar to step 35) prior to discharge from the process. The magnesium content of the clear aqueous liquid 127 which is drawn off from the step 18 is, however, too high for efficient electrolysis to occur and must be reduced. Any method known in the art to do this is suitable; the Table 1 shows that carbon dioxide of 50 tons daily is equivalent to the total magnesium dissolved solids in the brine; this is more than the minimum required for the two-step process; the quantity added in step 20 (recarbonation) with a two-step process is in the range up to 50 tons depending upon the fraction of magnesium drawn off in step 20 when operating in conjunction with step 18.

About six tons daily of magnesium oxide is shown as being admixed with the product water stream 138, having a sufficiently low pH, because of chlorine addition stream 137 and otherwise (not shown) by acid addition, so that a clear product water within pH specifications of potability is the result of this process.

The "calcination" step 22 comprises heating of the basic magnesium carbonate with hot flue gas, derived from combustion of fossil fuels, having a temperature exceeding 1000° C. The multiple hearth furnace employed in minerals processing is a device familiar in the art which is suitable. Another is the rotating tube furnace customarily used in alumina and cement manufacture. Carbon dioxide, possibly mixed with flue gas which is not injurious to the process, passes with the aid of a compressor or fan (not shown) to the recarbonation step of brine treatment.

The clear liquid (stream 131) from the recarbonation step 20 is drawn through filters of the multi-media variety (or another filter variety having equivalent or superior performance), which may be peripheral units of the recarbonation apparatus, or may be separate pressurized filters.

Customary backwashing arrangements, being occasional rapid reverse flow using filtrate which returns to step 20 material which clogs the filters, is used and said clogging material passes from the apparatus via stream 130, which may be dewatered and is washed with water so that the salt contained therein is removed to a suitable concentration level in the solids prior to calcination. The filtrate (stream 131) from the recarbonation step 20 is drawn off through filters of the multi-media variety (or another filter variety having equivalent or superior performance) which are normally part of the recarbonation step and pass to the separation step 24. The Table 1 shows stream 131 to contain 588 tons daily of dissolved solids which are the chlorides of sodium and potassium which are of a purity suitable of electrolysis.

The filtrate from the recarbonation step 20, which is stream 131, passes to the feed polishing step 36, or directly to the separation step 24 which it will do if a sufficiently low level of bicarbonate (500 parts per million approximately) is contained in stream 131. In the feed polishing step carbon dioxide and other gases are discharged by suitable means, for example bicarbonate is acidulated with hydrochloric acid followed by degassing under vacuum and neutralization of residual salt solution, which is step 36. The lean sodium chloride brine (140), which recirculates to the separation step 24 from the electrolysis step 26 via the polishing step 36, in any event enters the feed polishing degas unit, and is sufficiently acid to accomplish bicarbonate polishing of stream 131. Consequently, no separate flow of hydrochloric acid to step 36 is therefore shown in one drawing. The "calcination" step 22 comprises heating of the basic magnesium carbonate by hot flue gas (derived from combustion of fossil fuels) having a temperature exceeding 1000° C. enter indirectly through a tubewall or directly by passage of the said flue gas up a slowly rotating tube containing the magnesium oxide.

The lean mixed brine passes to the separation step 24. In this example, a four-effect distillation device which operates under vacuum of about one pound per square inch absolute (1 psia), range 0.25 psia to 6 psia approximately, is used which heats the brine to a maximum temperature of 80° C. approximately in the distillation process and converts stream 131 into two products; stream 110, having a concentration of 37.5 percent by weight of dissolved solids which are sodium chloride of purity suitable for electrolysis, and also stream 108, which is water having dissolved solids as illustrated in Table 1, amounting to 64 parts per million approximately blended with the product water stream. The stream 108 is used as a component of the potable product water 138. The stream 110 passes to the electrolysis step 26.

The electrolysis step 26 in this example is of the Kastner-Kellner (mercury cathode) process type, conducted in the Solvay variety of cell which is described in the U.S. Pat. Nos. 2,550,231; 2,551,248; 2,617,762; 2,648,630; 2,704,743; and 2,757,076. The electric power which is required for electrolysis may be from any source but in this example is supplied from a stream turbogenerator which discharges by-product steam to the brine heater of the four-effect distiller which accomplishes the separation of step 24; the amount of electrolysis is always equivalent to sodium chloride make-up from stream 131 and in this example requires about 88 megawatts. There is produced in this example about 400 tons daily of sodium hydroxide, (stream 112) dissolved in aqueous solution with 267 tons daily of water; about half of this solution is used in stream 113; one-eighth in stream 115, and the remaining three-eighths (steam 116) is surplus to the process and is a valuable product of commerce. The disposition of the caustic soda is outlined more precisely in Table 1 in the case of this example.

The chlorine product (stream 111) of the electrolysis in step 26 amounts to about 350 tons daily, and the hydrogen product amounts to about 10 tons daily, and both these are used in part in the step 28 in the production of hydrochloric acid of sufficient quantity for stream 118 (containing hydrochloric acid equivalent to 54.24 tons daily of chlorine) plus that in stream 120 (equivalent to 29.42 tons daily of chlorine). A futher quantity of chlorine (stream 137), which amounts to less than one ton daily in this example, is added to the product water in an amount (3 parts per million approximately) which is sufficient to sterilize the product water. The production of hydrochloric acid occurs spontaneously when chlorine is burned in a slight excess of hydrogen; a glass-lined vessel is used, and the efflux gas is absorbed in water in an absorber vessel of the same material. Some surplus chlorine (stream 136) may also be formed.

Hydrogen produced in electrolysis which is surplus to requirements for hydrochloric acid production is disposed as waste by burning.

The stream 118 passes to the decomposition step 30, in which limestone which is preferably crushed coarsely is digested or decomposed by immersion in hydrochloric acid with resultant production of carbon dioxide, and of aqueous acidic calcium chloride which is steam 123 and is added to step 16. If there is a surplus of carbon dioxide this surplus is discharged from the digester vessel leaving to pass in stream 124 sufficient carbon dioxide which, combined with carbon dioxide from calcination step 22, which is stream 123, is at least equivalent to the fraction of magnesium in stream 127 which the operator requires to precipitate as carbonate in order to effect the removal of magnesium from the brine which becomes stream 131. The digester vessel in which step 30 takes place is acid-proof brick lined, and of closed construction so that carbon dioxide may be drawn off by fans or compressors and passed to the step 20.

TABLE I

| | FLOW RATE (IN METRIC TONS DAILY) OF DISSOLVED SOLIDS | | | | | | | | |
|---|---|---|---|---|---|---|---|---|---|
| | | CATIONS | | | | ANIONS | | | |
| Line Number | Daily Water Flow Rate (in metric) tons) | Sodium | Potassium | Calcium | Magnesium | Chloride | Sulphate | Bicarbonate | Silicate |
| 101 | 136,700 | 86.55 | 8.80 | 57.64 | 24.68 | 121.63 | 210.14 | 24.34 | 2.07 |
| 102 | 129,200 | 81.81 | 8.33 | 54.47 | 23.29 | 114.96 | 198.61 | 23.00 | 1.95 |
| 103 | 7,500 | 4.74 | 0.47 | 3.17 | 1.39 | 6.67 | 11.53 | 1.34 | 0.12 |
| 104 | 129,200 | 79.05 | 8.05 | 1.10 | 0.46 | 120.35 | 13.93 | 2.32 | 0.39 |

TABLE I-continued

FLOW RATE (IN METRIC TONS DAILY) OF DISSOLVED SOLIDS

| Line Number | Daily Water Flow Rate (in metric tons) | CATIONS | | | | ANIONS | | | |
|---|---|---|---|---|---|---|---|---|---|
| | | Sodium | Potassium | Calcium | Magnesium | Chloride | Sulphate | Bicarbonate | Silicate |
| 105 | 91,500 | 55.98 | 5.70 | 0.78 | 0.33 | 85.23 | 9.84 | 1.65 | 0.27 |
| 106 | 37,700 | 23.07 | 2.35 | 0.32 | 0.13 | 35.13 | 4.08 | 0.67 | 0.12 |
| 107 | 91,500 | 16.86 | 1.49 | — | — | 25.41 | 1.92 | 0.24 | 0.27 |
| 108 | 44,019 | 1.01 | 0.12 | — | — | 1.67 | — | — | — |
| 109 | 37,700 | 62.19 | 6.57 | 1.10 | 0.46 | 94.94 | 12.00 | 2.07 | 0.12 |
| 110 | 918 | 214.00 | 22.00 | — | — | 352.44 | — | — | — |
| 111 | — | — | — | — | — | 272.93 | — | — | — |
| 112 | 280 | 214.00 | 22.00 | — | — | — | — | — | — |
| 113 | 80 | 108.51 | 11.03 | — | — | — | — | — | — |
| 114 | 200 | 105.49 | 10.97 | — | — | — | — | — | — |
| 115 | 32 | 44.28 | 4.46 | — | — | — | — | — | — |
| 116 | 168 | 61.21 | 6.51 | — | — | — | — | — | — |
| 117 | 3,270 | 110.42 | 11.23 | — | — | 12.58 | 189.34 | 21.23 | 1.61 |
| 118 | — | — | — | — | — | 54.24 | — | — | — |
| 119 | — | — | — | — | — | 29.42 | — | — | — |
| 120 | 4,473 | 2.83 | 0.27 | 1.88 | 0.83 | 177.82 | 6.87 | 0.79 | 0.07 |
| 121 | 4,473 | 2.77 | 0.28 | 53.37 | 22.83 | 3.97 | 6.87 | 0.79 | 0.07 |
| 122 | — | — | — | 30.66 | — | — | — | 47.43 | — |
| 123 | 99 | — | — | 30.66 | — | 54.24 | — | — | — |
| 124 | — | — | — | — | — | — | — | 45.90 | — |
| 125 | — | — | — | — | — | — | — | 50.38 | — |
| 126 | 45,200 | 170.71 | 17.63 | 0.20 | 24.68 | 323.02 | — | 24.10 | — |
| 127 | 45,200 | 213.82 | 21.97 | — | 20.08 | 352.44 | — | — | — |
| 128 | 20 | 0.01 | — | 0.20 | 4.60 | — | — | 24.08 | — |
| 129 | 130 | 0.80 | 0.06 | 88.10 | — | — | 208.21 | 0.02 | 1.80 |
| 130 | 50 | 0.18 | 0.03 | — | 20.08 | — | — | 5.47 | — |
| 131 | 45,000 | 214.00 | 22.00 | — | — | 352.44 | — | — | — |
| 132 | — | — | — | — | 2.94 | — | — | 4.40 | — |
| 133 | — | — | — | — | — | — | — | 4.48 | — |
| 134 | — | — | — | — | 17.41 | — | — | 35.54 | — |
| 135 | — | — | — | — | — | 15.28 | — | — | — |
| 136 | — | — | — | — | — | 79.51 | — | — | — |
| 137 | — | — | — | — | — | 0.14 | — | — | — |
| 138 | 135,519 | 17.87 | 1.61 | — | 2.94 | 27.08 | 1.92 | 0.24 | 0.27 |

What is claimed is:

1. A process for the removal of inorganic salts from an unpotable feed water stream containing said salts, said process comprising the steps of:
   (a) passing said feed water stream sequentially through at least two ion exchange beds, one of which is in the anion form and the other of which is in the cation form, to remove a significant portion of the anions and cations in the stream, and to form a filtrate stream,
   (b) regenerating at least a portion of the anion exchange bed by passing an aqueous sodium ion-containing regenerant stream through the anion exchange bed portion while step (a) is discontinued with respect to it, to form a spent anion exchange regenerant stream, including ions from said unpotable water previously retained in said anion exchange bed,
   (c) regenerating at least a portion of the cation exchange bed by passing an aqueous chloride ion-containing regenerant stream through the cation exchange bed portion while step (a) is discontinued with respect to it to form a spent cation exchange regenerant stream including ions from said unpotable water previously retained in said cation exchange bed.
   (d) mixing said spent anion and cation exchange regenerant streams together with an acidifying agent in the presence of soluble calcium ion to precipitate a calcium salt of at least one anion selected from the group consisting of sulfate, phosphate, silicate and fluoride, in the spent anion exchange regenerant stream, the amount of said soluble calcium being maintained in excess of equivalency to the sum of the sulphate, phosphate, silicate and fluoride remaining in said spent regenerant stream,
   (e) separating the product stream of step (d) into a precipitate portion and a soluble regenerant stream portion,
   (f) mixing said soluble regenerant stream portion from step (e) with a causticizing agent in the presence of carbonate ion to precipitate at least one cation selected from the group consisting of calcium, magnesium, ferrous or manganous, in the insoluble hydroxide or carbonate form, the amount of the said carbonate being maintained in excess of equivalency to the sum of the said calcium, magnesium, ferrous and manganous cations,
   (g) separating the product stream of step (f) into a soluble sodium chloride solution stream and a precipitate portion,
   (h) separating the soluble sodium chloride stream into a more concentrated sodium chloride stream and a less concentrated sodium chloride stream,
   (i) electrolyzing said more concentrated sodium chloride stream to form an aqueous sodium hydroxide stream, and an aqueous hydrochloric acid stream, and
   (j) recovering said less concentrated sodium chloride stream as a purified product water stream.

2. The process of claim 1 in which said regeneration steps (b) and (c) are performed in situ on the anion and cation exchange beds, respectively, during periodic discontinuance of step (a).

3. The process of claim 1 in which said regeneration steps (b) and (c) are performed on portions of the anion and cation exchange beds while step (a) is performed continuously and the regenerated anion and cation exchange bed portions are recycled to the operating anion and cation exchange beds, respectively.

4. The process of claim 1 in which an external soluble calcium salt is added to step (d) to maintain said soluble calcium ion in excess of said equivalency.

5. The process of claim 1 in which an external source of carbonate ion added in step (f) to maintain said carbonate ion in excess of equivalency.

6. The process of claim 5 in which said external carbonate source is carbon dioxide.

7. The process of claim 1 in which the purified product of step (j) forms a portion of a potable water stream.

8. The process of claim 1 in which the separation of step (h) is performed by distillation.

9. The process of claim 1 in which magnesium carbonate is precipitated in step (f) by recarbonation.

10. The process of claim 9 in which said magnesium carbonate is calcined to form magnesium oxide and carbon dioxide and the latter is recycled as a carbonate ion source to step (f).

11. The process of claim 1 in which chlorine gas is produced during electrolysis step (i) and is added to said purified water stream to form potable water.

12. The process of claim 1 in which a portion of said soluble calcium in step (d) is calcium chloride formed by reacting insoluble calcium with hydrochloric acid previously formed as a product of electrolysis in step (i).

13. The process of claim 12 in which said insoluble calcium is calcium carbonate, and carbon dioxide is produced as a reaction product and is used as a carbonate source in step (f).

14. The process of claim 1 in which the feed water of claim 1 comprises ground water from an inland source.

15. The process of claim 1 in which a portion of said aqueous hydrochloric acid stream formed in step (i) is employed as the acidifying agent in step (d).

16. The process of claim 1 in which a portion of said aqueous sodium hydroxide stream formed in step (i) is employed as the causticizing agent in step (f).

17. The process of claim 1 in which sulfate ion is present in step (d) and barium ion is added in the said step to precipitate sulfate ion.

18. The process of claim 1 in which a portion of said aqueous sodium hydroxide stream formed in step (i) is directed in said regenerant stream through said anion exchange bed of step (b).

19. The process of claim 1 in which a portion of said aqueous hydrochloric acid stream is directed in said regenerant stream through said cation exchange bed of step (c).

20. The process of claim 1 together with the steps of:
(k) separating the filtrate from step (a) into a more concentrated sodium chloride filtrate stream and a less concentrated sodium chloride filtrate stream, and
(l) directing at least a portion of the more concentrated filtrate stream to step (d) to increase the sodium chloride content in the stream separated in step (f) and thus increase the sodium hydroxide and hydrochloric acid produced in step (i).

* * * * *